United States Patent
Muhl et al.

(10) Patent No.: US 7,503,089 B2
(45) Date of Patent: Mar. 17, 2009

(54) INFLATABLE ACTUATOR FOR A DOCK LEVELER DECK

(75) Inventors: Tim Muhl, Slinger, WI (US); Andrew Wanie, Jackson, WI (US); Norbert Hahn, Franklin, WI (US); Mark G. Petri, Mequon, WI (US); Pamela Pietrangelo, Oak Creek, WI (US); Reinhardt E. Sander, Wauwatosa, WI (US); Jeffrey R. Schwager, Mequon, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 134 days.

(21) Appl. No.: 11/099,151

(22) Filed: Apr. 5, 2005

(65) Prior Publication Data
US 2006/0218731 A1    Oct. 5, 2006

(51) Int. Cl.
*E01D 1/00*    (2006.01)
*E01C 11/04*    (2006.01)
(52) U.S. Cl. ............................ 14/69.5; 14/71.1; 14/71.3
(58) Field of Classification Search ................. 14/69.5, 14/71.1, 71.3
See application file for complete search history.

(56) References Cited

U.S. PATENT DOCUMENTS

| | | |
|---|---|---|
| 1,421,901 A | 7/1922 | Brotsch, Jr. |
| 1,868,935 A | 7/1932 | Breneman |
| 2,070,960 A | 2/1937 | Phillips |
| 2,495,092 A | 1/1950 | Cox et al. |
| 2,610,824 A | 9/1952 | Grier |
| 2,689,965 A | 9/1954 | Fenton |
| 2,804,118 A | 8/1957 | Bayerkohler |
| 2,846,703 A | 8/1958 | Adley |
| 3,012,804 A | 12/1961 | Jeavons |
| 3,117,332 A | 1/1964 | Kelley et al. |
| 3,211,425 A | 10/1965 | Greulich et al. |
| 3,368,229 A | 2/1968 | Pfleger |

(Continued)

FOREIGN PATENT DOCUMENTS

AU    579830    12/1988

(Continued)

OTHER PUBLICATIONS

International Searching Authority, "International Search Report" mailed on Jun. 19, 2007, 2 pages.

(Continued)

*Primary Examiner*—Raymond Addie
(74) *Attorney, Agent, or Firm*—Hanley, Flight & Zimmerman, LLC

(57) ABSTRACT

A dock leveler for a truck loading dock includes a pivotal deck that is raised by an inflatable actuator. The actuator includes a pliable upper section that when inflated has a generally vertical cylindrical shape that can provide a heavy deck with substantial columnar support. The actuator also includes a relatively rigid base that is sealingly joined to the pliable upper section such that upper section and the rigid base define an inner chamber of air. A blower for inflating the actuator can be installed inside or outside the actuator. In some embodiments, a valve system reverses the airflow so that the blower can forcibly deflate and compress the actuator up against the bottom of the deck so that the area underneath the actuator can be cleaned.

26 Claims, 9 Drawing Sheets

U.S. PATENT DOCUMENTS

| | | |
|---|---|---|
| 3,379,411 A | 4/1968 | Vanderjagt |
| 3,493,984 A | 2/1970 | Reinhard |
| 3,521,861 A | 7/1970 | Freudenthal et al. |
| 3,528,118 A | 9/1970 | Smith |
| 3,628,487 A | 12/1971 | Bennett |
| 3,659,899 A | 5/1972 | Phillips et al. |
| 3,675,377 A | 7/1972 | Suter |
| 3,685,077 A | 8/1972 | Wiener et al. |
| 3,694,840 A | 10/1972 | Loblick |
| 3,711,157 A | 1/1973 | Smock |
| 3,763,514 A | 10/1973 | Bishop |
| 3,784,255 A | 1/1974 | Smock |
| 3,786,530 A | 1/1974 | Le Clear |
| 3,799,504 A | 3/1974 | Vaughen |
| 3,822,861 A | 7/1974 | Scott |
| 3,835,497 A | 9/1974 | Smith |
| 3,858,264 A | 1/1975 | Kuhns et al. |
| 3,877,102 A | 4/1975 | Artzberger |
| 3,902,213 A | 9/1975 | Pfleger et al. |
| 3,921,241 A | 11/1975 | Smith |
| 3,977,349 A | 8/1976 | Hummel |
| 3,995,342 A | 12/1976 | Wiener |
| 3,997,932 A | 12/1976 | Artzberger |
| 4,012,804 A | 3/1977 | Catlett |
| RE29,302 E | 7/1977 | De Lepeleire |
| 4,036,472 A | 7/1977 | Orndorff, Jr. |
| 4,060,170 A | 11/1977 | Walters |
| 4,061,310 A | 12/1977 | Vetter |
| 4,081,874 A | 4/1978 | Artzberger |
| 4,097,949 A | 7/1978 | Barrett |
| 4,118,817 A | 10/1978 | Burnham |
| 4,149,469 A | 4/1979 | Bigler |
| 4,156,974 A | 6/1979 | Huang |
| 4,238,003 A | 12/1980 | Hunter |
| 4,279,050 A | 7/1981 | Abbott |
| 4,293,969 A | 10/1981 | Frommelt |
| 4,319,666 A | 3/1982 | Hunter |
| 4,328,602 A | 5/1982 | Bennett |
| 4,343,058 A | 8/1982 | Loblick |
| 4,455,703 A | 6/1984 | Fromme et al. |
| 4,470,578 A | 9/1984 | Arvidsson et al. |
| 4,488,325 A | 12/1984 | Bennett et al. |
| 4,538,311 A | 9/1985 | Hall et al. |
| 4,572,579 A | 2/1986 | Saito |
| 4,625,631 A | 12/1986 | Vera |
| 4,629,162 A | 12/1986 | Porche |
| 4,630,989 A | 12/1986 | Davey |
| 4,665,579 A | 5/1987 | Bennett et al. |
| 4,688,760 A | 8/1987 | Garman et al. |
| 4,722,655 A | 2/1988 | Bonerb |
| 4,735,457 A | 4/1988 | Bonerb et al. |
| 4,776,052 A | 10/1988 | Delgado |
| 4,782,542 A | 11/1988 | Sato |
| 4,784,567 A | 11/1988 | Hageman et al. |
| 4,786,032 A | 11/1988 | Garman et al. |
| 4,845,792 A | 7/1989 | Bakula et al. |
| 4,854,801 A | 8/1989 | Bonerb |
| 4,861,215 A | 8/1989 | Bonerb |
| 4,900,217 A | 2/1990 | Nelson |
| 4,921,074 A | 5/1990 | Ochs |
| 4,922,568 A | 5/1990 | Hageman |
| 4,937,906 A | 7/1990 | Alexander |
| 4,948,107 A | 8/1990 | Orndorff, Jr. |
| 4,955,923 A | 9/1990 | Hageman |
| 4,974,276 A | 12/1990 | Alexander |
| 5,022,809 A | 6/1991 | Hinson |
| 5,042,103 A | 8/1991 | Megens |
| 5,067,774 A | 11/1991 | Trowland |
| 5,068,938 A | 12/1991 | Roscoe |
| 5,088,143 A | 2/1992 | Alexander |
| 5,090,773 A | 2/1992 | Guillaume |
| 5,178,367 A | 1/1993 | Vaughen |
| 5,232,202 A | 8/1993 | Watson |
| 5,274,867 A | 1/1994 | Hageman |
| 5,340,141 A | 8/1994 | Thorndyke |
| 5,414,886 A | 5/1995 | Sust et al. |
| 5,440,772 A | 8/1995 | Springer et al. |
| 5,446,938 A | 9/1995 | Warner et al. |
| 5,450,643 A | 9/1995 | Warner |
| 5,471,693 A | 12/1995 | Hodges |
| 5,475,888 A | 12/1995 | Massey |
| 5,481,774 A | 1/1996 | Hodges et al. |
| 5,500,968 A | 3/1996 | Hodges |
| 5,509,687 A | 4/1996 | Thorndike |
| 5,522,107 A | 6/1996 | Hageman et al. |
| 5,522,108 A | 6/1996 | Massey et al. |
| 5,522,678 A | 6/1996 | Marshall et al. |
| 5,560,684 A | 10/1996 | Gilmore |
| 5,564,238 A | 10/1996 | Ellis |
| 5,600,859 A | 2/1997 | Hodges et al. |
| 5,621,938 A | 4/1997 | Warner |
| 5,651,155 A | 7/1997 | Hodges et al. |
| 5,657,502 A | 8/1997 | Ellis |
| 5,669,086 A | 9/1997 | Garman |
| 5,690,314 A | 11/1997 | Williams |
| 5,774,920 A | 7/1998 | Alexander |
| 5,802,650 A | 9/1998 | Massey et al. |
| 5,802,651 A * | 9/1998 | Massey et al. ............... 14/71.3 |
| 5,832,554 A | 11/1998 | Alexander |
| 5,975,643 A | 11/1999 | Smith et al. |
| 5,996,156 A | 12/1999 | Massey |
| 6,085,375 A * | 7/2000 | Holm ......................... 14/71.7 |
| 6,098,227 A | 8/2000 | Meichtry et al. |
| 6,216,303 B1 | 4/2001 | Massey |
| 6,240,587 B1 | 6/2001 | Meichtry et al. |
| 6,267,447 B1 | 7/2001 | Hendry et al. |
| 6,267,448 B1 * | 7/2001 | Hendry et al. ............ 298/22 R |
| 6,286,812 B1 * | 9/2001 | Cherry ....................... 254/9 C |
| 6,360,393 B1 | 3/2002 | Fritz |
| 6,460,212 B2 | 10/2002 | Massey et al. |
| 6,643,880 B1 | 11/2003 | Massey et al. |
| 6,711,774 B2 | 3/2004 | Hodges |
| 6,760,944 B2 | 7/2004 | Hodges |
| 2002/0035760 A1 | 3/2002 | Massey et al. |
| 2003/0204921 A1* | 11/2003 | Bender et al. ................ 14/71.3 |
| 2004/0221404 A1* | 11/2004 | Bender et al. ................ 14/69.5 |

FOREIGN PATENT DOCUMENTS

| | | |
|---|---|---|
| AU | 588734 | 9/1989 |
| DE | 0165168 | 9/1903 |
| DE | 1207221 | 12/1965 |
| DE | 2109564 | 9/1972 |
| DE | 2354388 | 5/1974 |
| DE | 2721384 | 11/1978 |
| DE | 8220586 | 10/1982 |
| DE | 3407496 | 9/1984 |
| DE | 3743551 | 7/1989 |
| DE | 8908188 | 8/1989 |
| EP | 0001316 | 4/1979 |
| EP | 0386850 | 9/1990 |
| EP | 0620880 | 10/1994 |
| EP | 0721422 | 7/1996 |
| EP | 0721423 | 7/1996 |
| EP | 0721424 | 7/1996 |
| EP | 0857672 | 8/1998 |
| GB | 835142 | 5/1960 |
| GB | 930163 | 7/1963 |
| GB | 2023231 | 12/1979 |
| GB | 2048210 | 12/1980 |
| GB | 2145041 | 3/1985 |
| GB | 2206158 | 12/1988 |
| GB | 2316715 | 3/1998 |
| NL | 7710543 | 3/1979 |

| | | |
|---|---|---|
| SU | 0161243 | 3/1964 |
| SU | 0931701 | 5/1982 |
| SU | 1362826 | 12/1987 |
| WO | 9011204 | 10/1990 |
| WO | 9313267 | 7/1993 |
| WO | 9509790 | 4/1995 |
| WO | 9509791 | 4/1995 |
| WO | 9509792 | 4/1995 |
| WO | 0026471 | 5/2000 |

OTHER PUBLICATIONS

International Searching Authority, "Written Opinion" mailed on Jun. 19, 2007, 6 pages.

International Bureau, International Preliminary Report on Patentability (Chapter I of the Patent Cooperation Treaty) (PCT Rule 44bis. 1(c)), issued by the International Bureau of WIPO on Oct. 18, 2007 (6 pages), in a counterpart foreign application PCT/US2006/012742).

Kelley Company, Inc., Installation Instructions of Kelley Dyna-Load Hydraulic Dockleveler, Mar. 1, 1980 (5 pages).

Kelley Company, Inc., Installation Instructions and Owners Manual of Kelley Dyna-Load Mechanical Dockleveler, May 10, 1978 (5 pages).

Kelley Company, Inc., Brochure of Kelley E-Z Clean Hydraulic Docklevelers, Jan. 1, 1980 (1 page).

Kelley Company, Inc., Brochure of Kelley Loading Dock Accessories, Jan. 1, 1980 (1 page).

Rite-Hite Corporation, Brochure of Rite-Hite Semi-Automatic Dock Leveler, published on May 1, 1980 (2 pages).

Rite-Hite Corporation, Bulletin of Rite-Hite Hinge-Lip Adjustable Dock Levelers, Bulletin No. HLB-68-2, published on Feb. 1, 1968 (4 pages).

\* cited by examiner

INFLATABLE ACTUATOR FOR A DOCK LEVELER DECK

TECHNICAL FIELD

The subject invention generally relates to dock levelers, and more specifically to a dock leveler whose deck is raised by an inflatable member.

BACKGROUND

Loading docks often include a dock leveler to facilitate the loading or unloading of a truck's cargo. The dock leveler provides a bridge that material handling equipment and personnel can use to travel between a loading dock platform and the bed of the truck. Dock levelers usually include a deck or ramp that can pivot about its rear edge to raise or lower its front edge. Often a lip plate extends from the front edge of the deck and is adapted to engage the rear of the truck bed. The lip plate is usually movable between a stored, retracted position and an extended, vehicle-engaging position. The pivotal movement of the deck enables the dock leveler to set the lip plate on or remove it from the truck bed.

To pivot a deck, a dock leveler usually includes some type of actuator that extends, expands or otherwise moves to force the deck upward. Downward movement of the deck may be achieved by relying on the weight of the deck (biased down dock leveler) or by physically pushing the deck back down with an external force or weight (biased up dock leveler), such as the weight of a person standing on the deck.

There are a wide variety of well-known actuators available today. Some common ones include, hydraulic cylinders, pneumatic cylinders, coil springs, high-pressure air springs, linear motors, and inflatable actuators. The subject invention pertains to inflatable actuators, which comprise an inflatable chamber disposed underneath a deck. To raise the deck, a blower discharges pressurized air into the chamber, which causes the chamber to expand and lift the deck. Upon de-energizing the blower, the weight of the deck forces the air within the chamber to backflow through the blower, whereby the chamber controllably collapses to lower the deck.

Although inflatable actuators are effective at raising a deck, the blowers of such actuators can be particularly loud. Moreover, a pit in which a dock leveler is installed can become quite dirty from the traffic across the deck and by debris infiltration from the adjacent driveway. An inflatable chamber, its blower and various other dock leveler components underneath the deck can be difficult to clean due to the limited space of a typical dock leveler pit.

Consequently, a need exists for an inflatable actuator that is quieter and easier to clean and whose blower is protected from debris.

SUMMARY

In some embodiments, an inflatable actuator for a dock leveler has an internal volume of air contained between a pliable upper section a more rigid base.

In some embodiments, the inflatable actuator is substantially cylindrical.

In some embodiments, the more rigid base includes an upwardly extending flange joined to which the pliable upper section is joined.

In some embodiments, the inlet and/or outlet of the blower passes through the more rigid base to maintain the integrity of the pliable upper section.

In some embodiments, the blower is installed inside the inflatable actuator.

In some embodiments, the blower is mounted to the base of inflatable actuator.

In some embodiments, the inflatable actuator includes an access opening.

In some embodiments, an inflatable actuator includes a valve system that enables a blower to selective inflate or forcibly deflate the actuator.

In some embodiments, a blower can forcibly collapse an inflatable actuator while the dock leveler deck remains elevated and substantially stationary.

DETAILED DESCRIPTION

Figure 1:
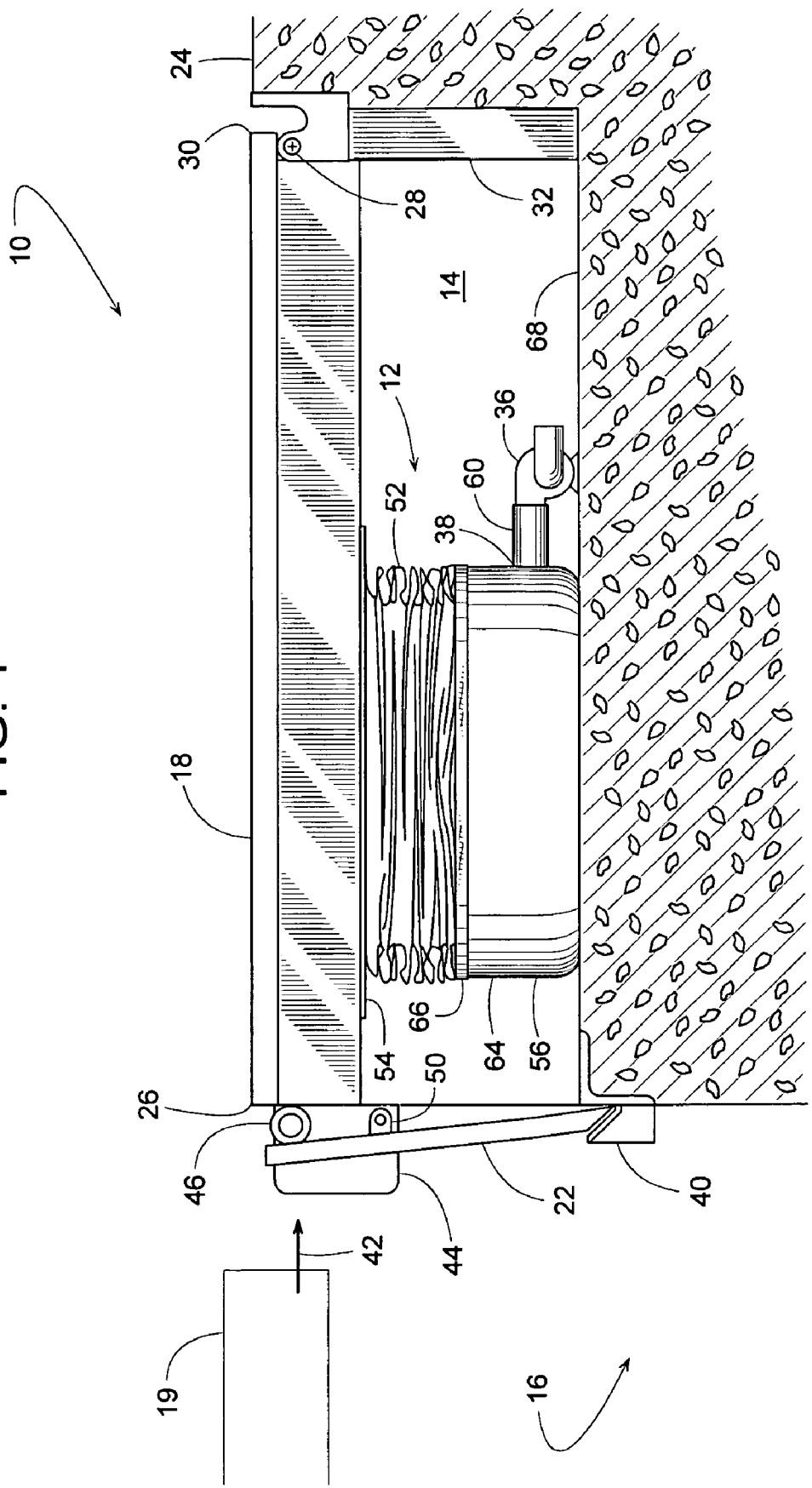
FIG. 1 is a side view of a dock leveler whose deck, shown in a cross-traffic position, can be raised by an inflatable actuator.
Figure 2:
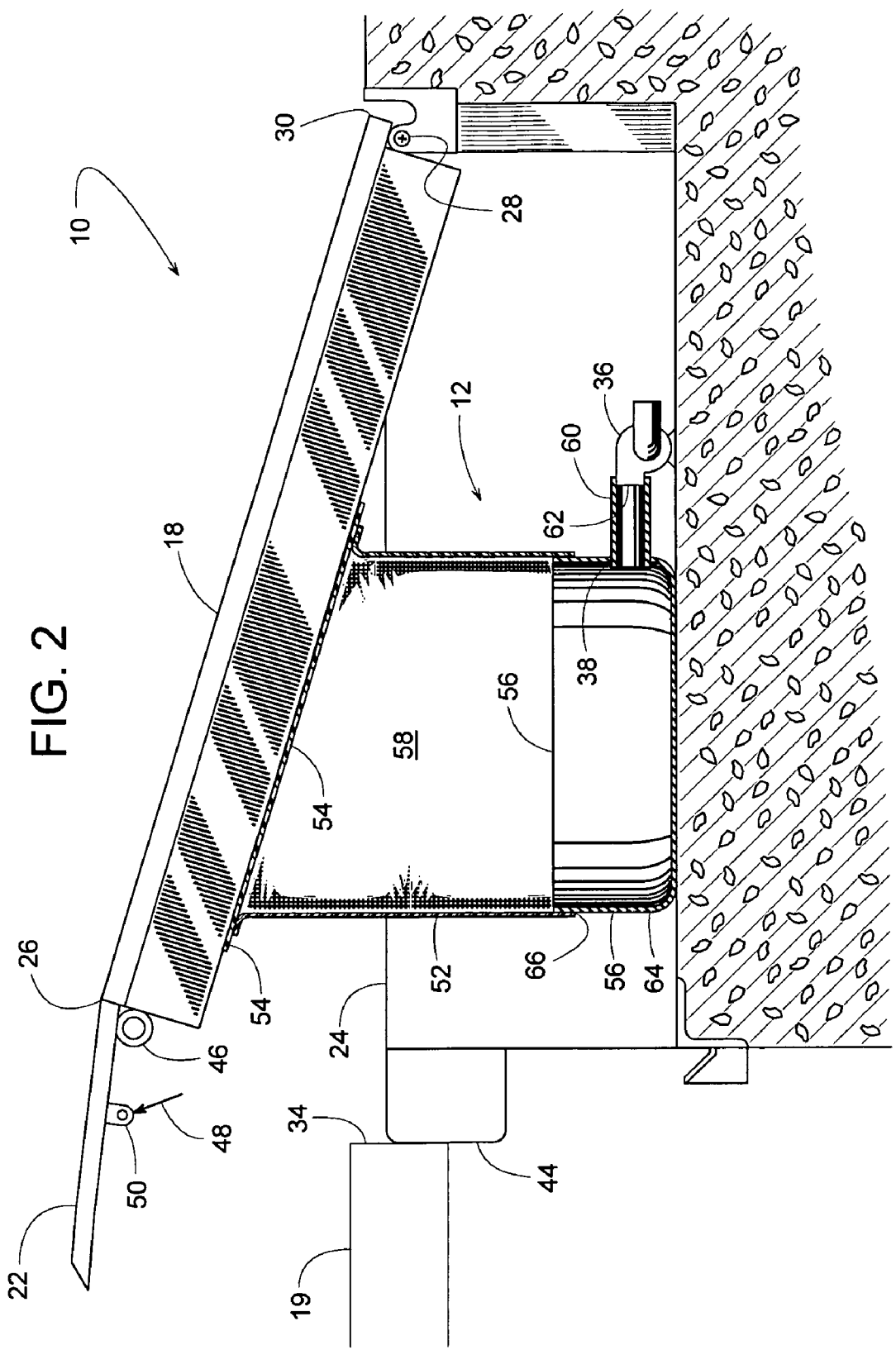
FIG. 2 is a cross-sectional side view similar to FIG. 1 but with the actuator inflated to lift the deck.
Figure 3:
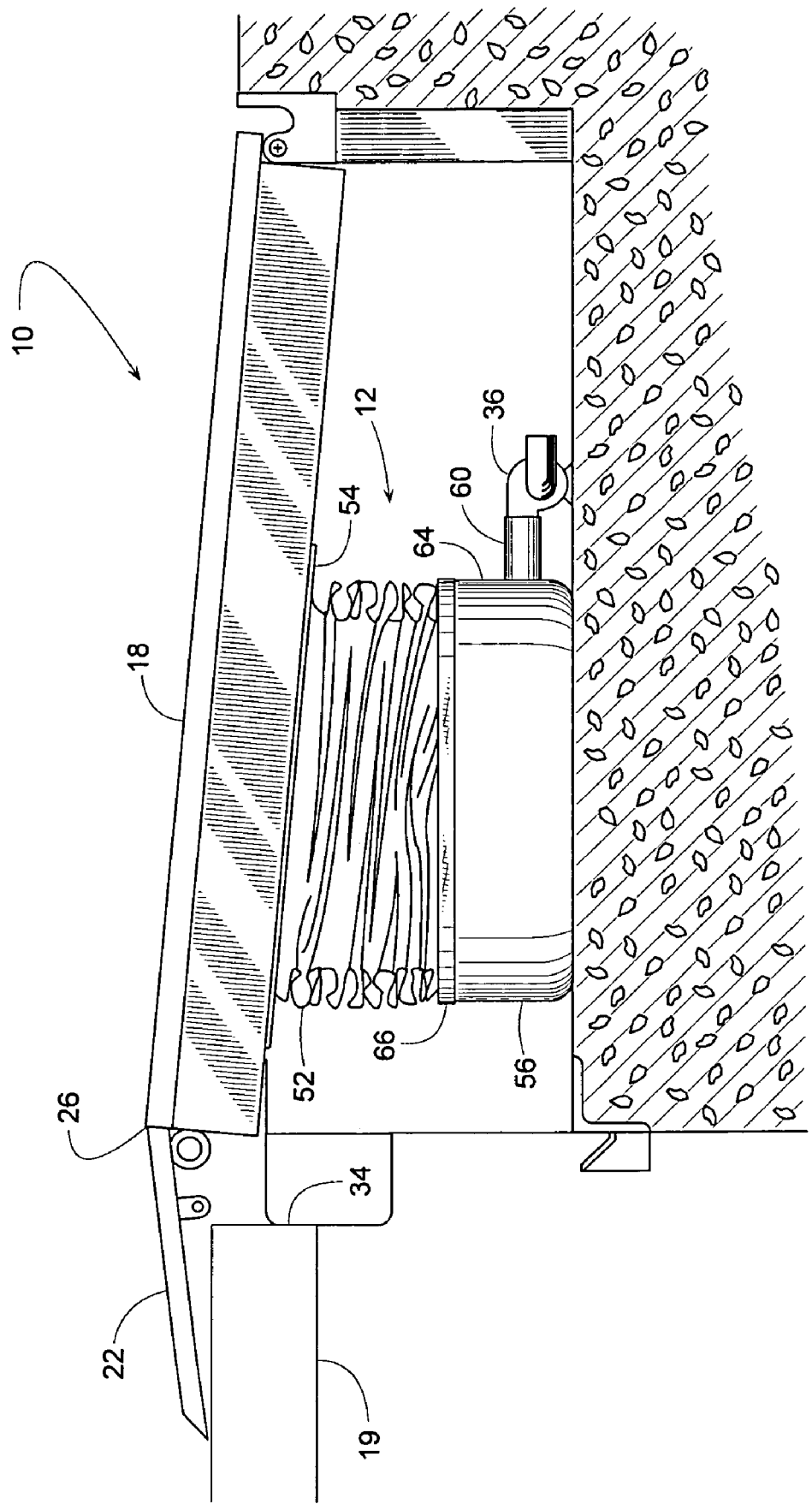
FIG. 3 is similar to FIG. 1 but with the actuator deflated and the lip of the dock leveler resting upon the rear of a truck bed.

FIGS. 1-3 show various operating positions of a dock leveler 10 and its inflatable actuator 12 which are installed within a pit 14 of a loading dock 16. To facilitate loading or unloading cargo from a vehicle 19 (e.g., truck trailer, etc.), dock leveler 10 includes a pivotal deck 18 and a lip 22 that provide a path for personnel and material handling equipment to travel between a platform 24 of the dock and vehicle 19. To selectively raise and lower a front edge 26 of the deck, inflatable actuator 12 can pivot deck 18 about a hinge 28 that couples a rear edge 30 of the deck to a supporting frame 32. This enables dock leveler 10 to set lip 22 on or remove it from the truck bed. Lip 22 extends from deck 18 to bridge the gap between front edge 26 and a rear edge 34 of vehicle 19.

To raise deck 18, a blower 36 or some other source of pressurized air forces air through an inlet 38 to expand inflatable actuator 12. To lower deck 18, blower 36 is de-energized, which allows the deck's weight to controllably collapse actuator 12 by forcing air to backflow through blower 36.

The sequence of operation at dock 16 typically begins with dock leveler 10 at its stored, cross-traffic position of in FIG. 1. In this position, inflatable actuator 12 is deflated, lip 22 is at its pendant position supported by a set of lip keepers 40, and the top surface of deck 18 is generally flush with platform 24. Arrow 42 represents vehicle 19 backing the rear edge of its truck bed toward a bumper 44 of dock 16.

Next, in FIG. 2, blower 36 is energized to inflate actuator 12 with relatively low-pressure air (preferably less than 10 psig.). A centrifugal blower is just one example of such a source of low-pressure air. As inflatable actuator 12 expands, it forces deck 18 upward. Lip 22, which a hinge 46 pivotally couples to the deck's front edge 26, pivots outward to extend out over the truck bed of vehicle 19. Arrow 48 schematically represents any actuator capable of moving lip 22 (e.g., by acting upon a lug 50 extending from lip 22). Examples of such a lip actuator include, but are not limited to, pneumatic cylinders, low-pressure air actuator, coil springs, high-pressure air springs, linear motors, mechanical linkages responsive to the movement of deck 18, and various combinations thereof.

After lip 22 extends out over rear edge 34 of vehicle 19, it is selectively locked or otherwise held in this position and blower 36 is de-energized to deflate actuator 12. This allows deck 18 to descend to lower lip 22 upon the truck bed of vehicle 19, as shown in FIG. 3. In this position, cargo can be readily added or removed from vehicle 19.

To enable inflatable actuator 12 to raise and lower deck 18 in such a manner, actuator 12 comprises a pliable upper section 52, such as a nylon fabric tube, bladder, bag, or the like. An upper panel 54 of section 52 seals the upper end of actuator 12. To seal a lower end of the actuator, upper section 52 can be bonded, fused, welded, or otherwise attached to a more rigid base 56. Together, the side portion of pliable upper section 52, upper panel 54, and base 56 define an expandable chamber that contains an internal volume of air 58. A tube 60 places inlet 38 of actuator 12 in fluid communication with a discharge outlet 62 of blower 36, so blower 36 can force air into the chamber to expand actuator 12. When blower 36 is de-energized, the weight of deck 18 can force the air out of the chamber in reverse flow through blower 36, as deck 18 descends.

Although the structural details of actuator 12 may vary, in some embodiments, pliable upper section 52 is made of a nylon fabric and base 56 is made of ABS (Acrylonitrile Butadiene Styrene). Actuator 12 is generally cylindrical when inflated. In some cases, base 56 includes an upwardly extending flange 64 that adds rigidity to base 56 and provides a generally strong, stationary wall through which tube 60 can extend. The rigidity of base 56 and joining the base in direct sealing relationship to upper section 52 at a circumferential joint 66 may provide several benefits. First, a rigid base may be less likely to bulge under pressure, thus actuator 12 maintains a generally constant area of contact between the bottom of actuator 12 and a floor 68 of pit 14. With a constant area of contact, debris in the pit is less likely to work itself underneath actuator 12. Second, a rigid base may be more durable and less likely to be punctured by debris on pit floor 68. Third, a smooth, rigid base may be easier to clean. Fourth, having upper section 52 sealingly joined to base 56 at joint 66 eliminates the need for an additional internal sealing member just to seal off the bottom of actuator 12.

Figure 4:
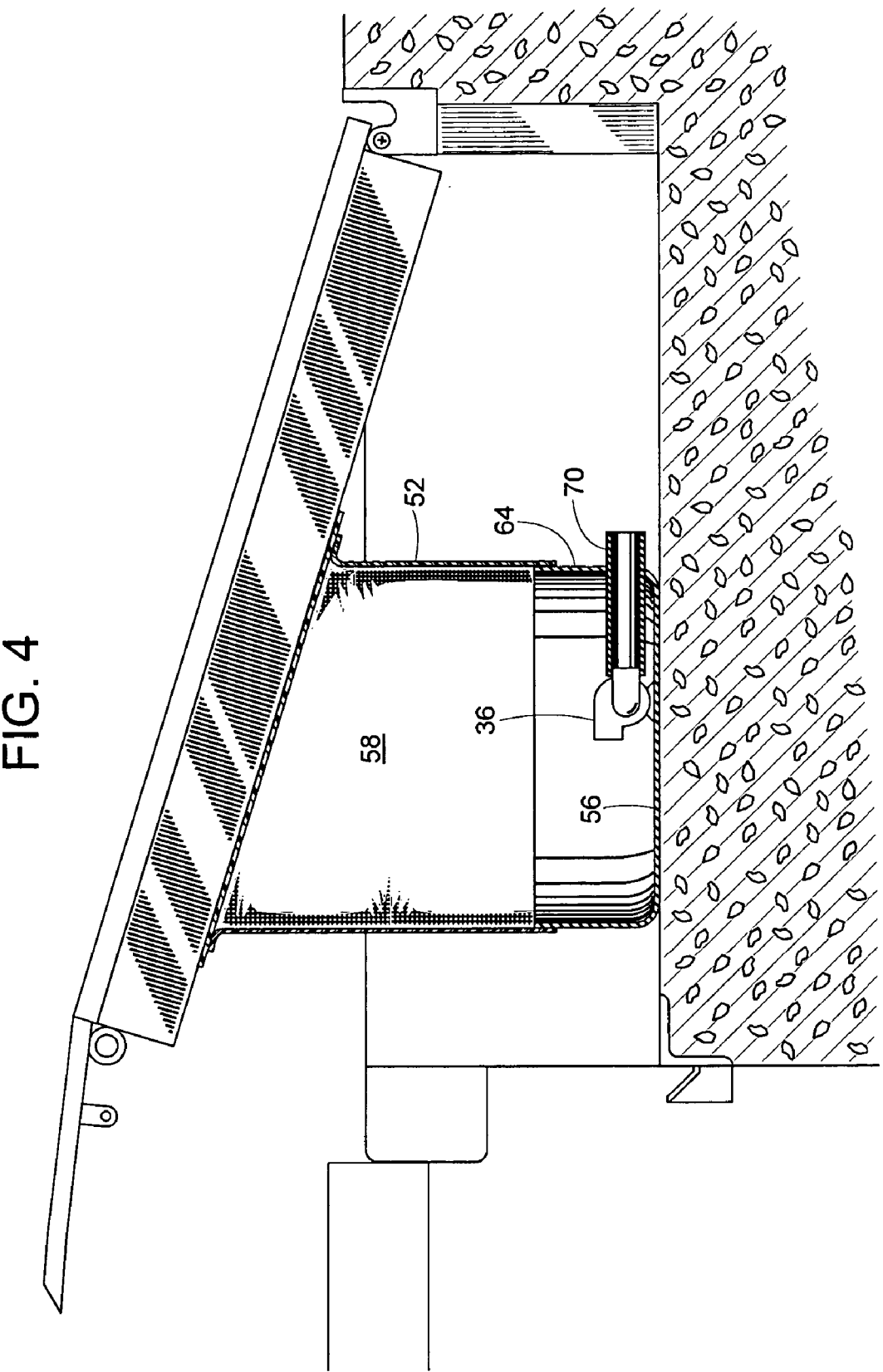
FIG. 4 is similar to FIG. 2 but showing another embodiment where the blower is inside the actuator.
Figure 5:
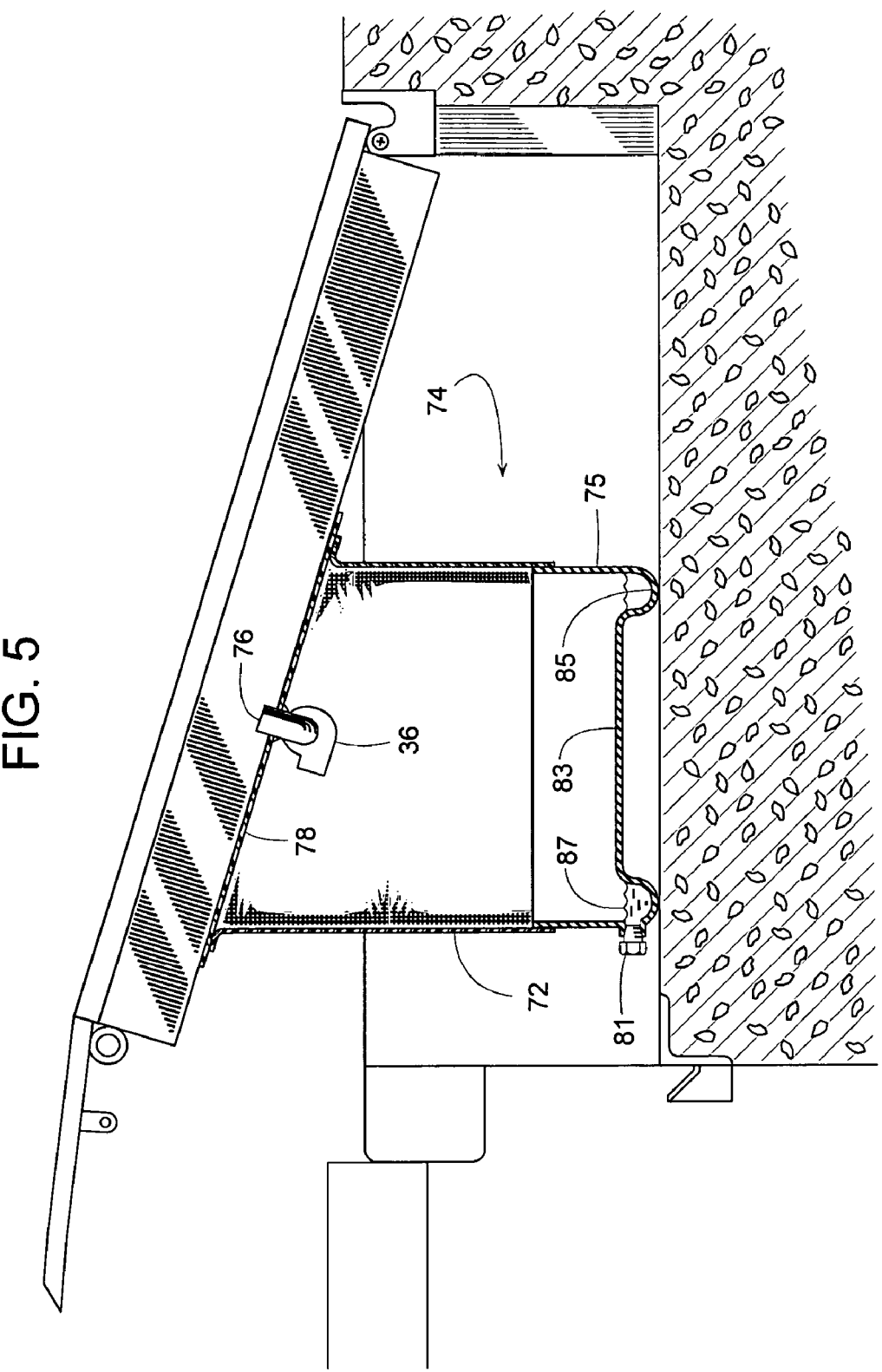
FIG. 5 is similar to FIG. 4 but showing the blower installed at another location inside the actuator.

Referring to FIGS. 4 and 5, in some cases blower 36 may be installed somewhere inside the inflatable actuator to provide quieter operation and help keep the blower clean. In FIG. 4, for example, blower 36 is mounted to base 56, and an inlet tube 70 extending from the suction opening of blower 36 and passing through flange 64 or through upper section 52 places the internal volume of air 58 in fluid communication with the exterior air. A suitable air filter can be connected in series with tube 70 and installed outside of the inflatable actuator so that the filter can be readily serviced.

In FIG. 5, an upper section 72 of an inflatable actuator 74 supports blower 36. Tube 76 (e.g., a flexible hose) extending from the suction opening of blower 36 and passing through an upper panel 78 of upper section 72 places the internal volume of air in fluid communication with the exterior air. Although tube 76 is shown extending thorough upper panel 78, alternatively tube 76 could also be routed through upper section 72, a base 75 or any other part of inflatable actuator 74.

In this example, base 75 is shown to include a drain plug 81 for draining condensation 87 or any other fluid that may happen to collect at the bottom of base 75. Base 75 may also include a raised central portion 83 that creates a trough 85 for collecting the fluid and directing it toward drain plug 81. Bases 56, 64 and 86 can be modified to also include such a drain plug and trough.

Figure 6:
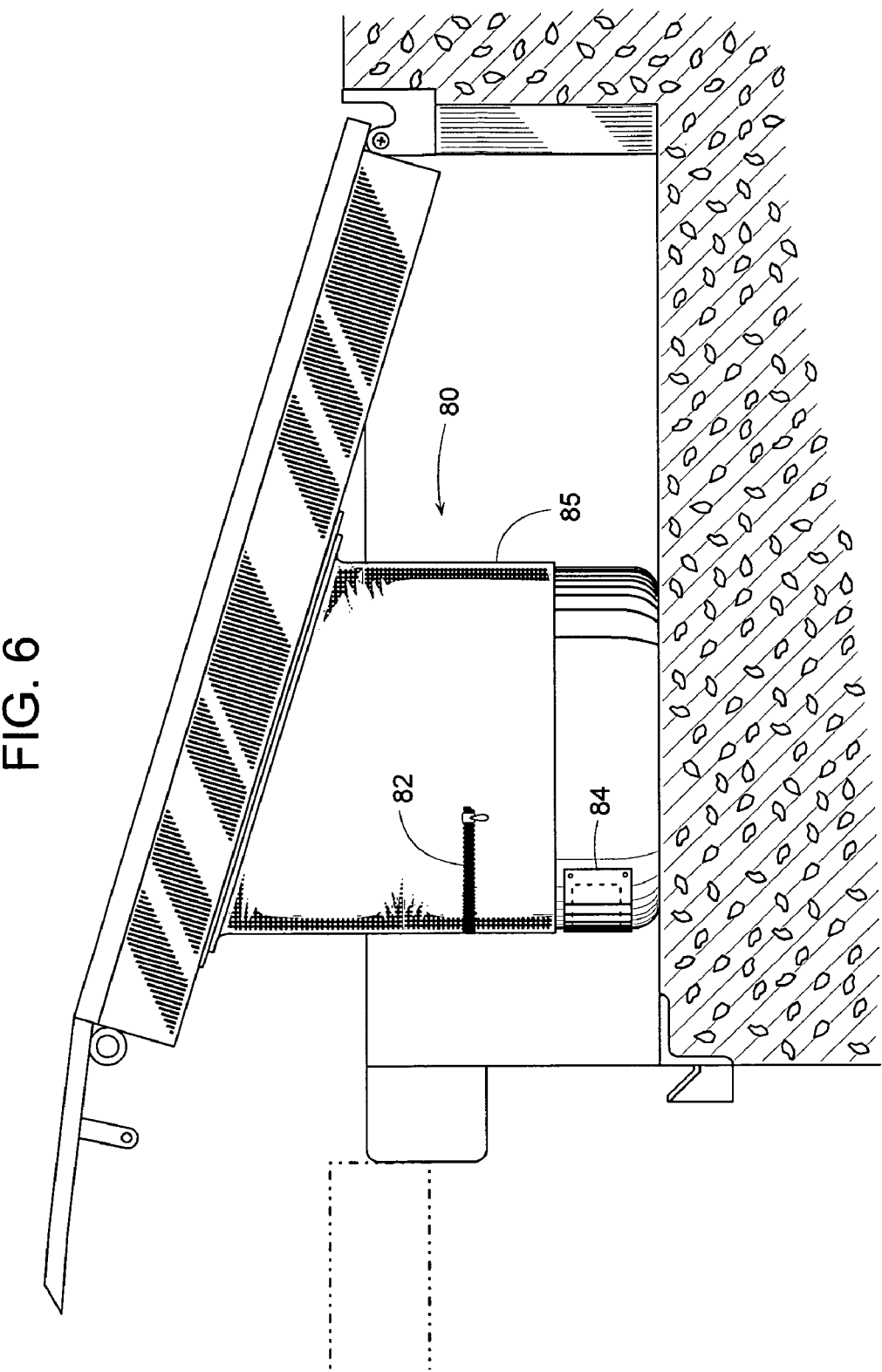
FIG. 6 is similar to FIGS. 4 and 5 but showing an inflatable actuator with various access openings that are covered or otherwise closed.

Referring to FIG. 6, to provide service access to an internally mounted blower, an inflatable actuator 80 may include an access opening, which may be selectively closed by some appropriate device, such as a zipper 82 or a removable cover 84. Zipper 82 is preferably installed horizontally as shown because the bursting stress in an upper section 85 is greater in the circumferential direction than vertically, thus a horizontal zipper is less likely to pull apart. Moreover, a horizontal zipper avoids being creased at multiple locations when upper section 85 folds as actuator 80 collapses.

Figure 7:
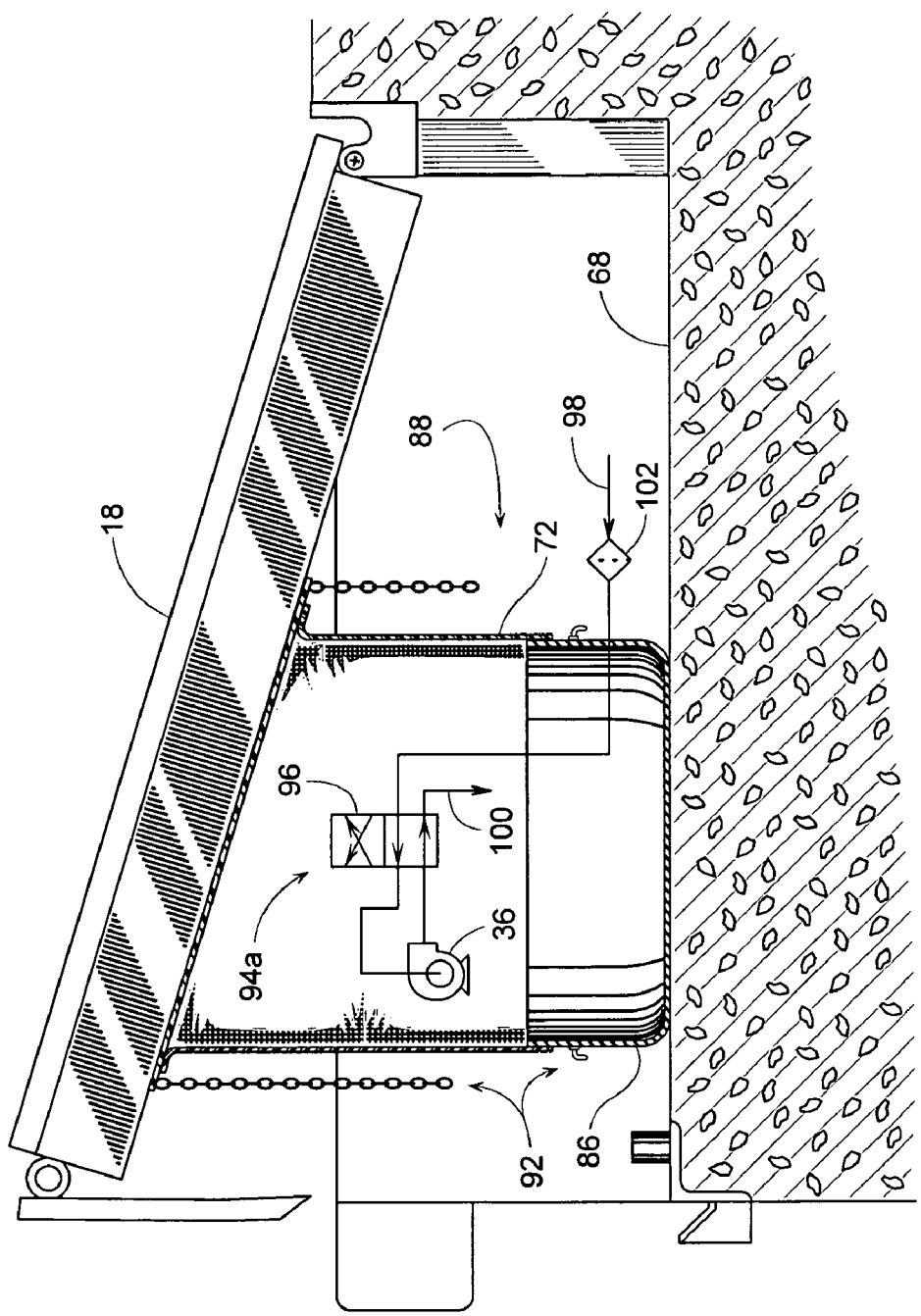
FIG. 7 is cross-sectional side view showing an inflated actuator with an internal blower and valve system, wherein the valve system is schematically illustrated.
Figure 8:
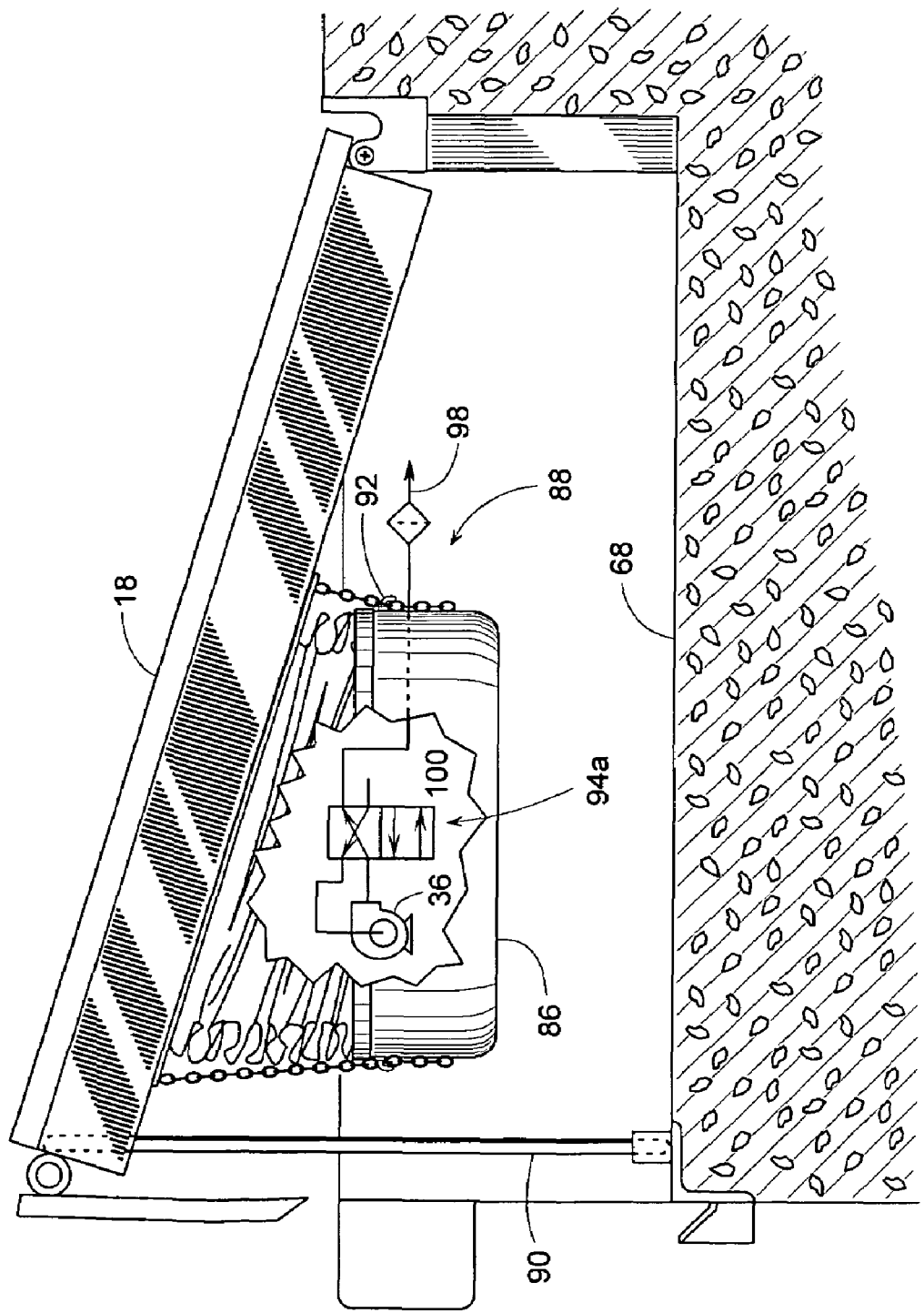
FIG. 8 is a side view of the actuator of FIG. 7 but with a portion cut away to show the inside of the actuator when forcible deflated up against the underside of the deck.

Referring to FIGS. 7 and 8, it may be desirable to elevate deck 18 and lift a base 86 of an inflatable actuator 88 off the dock pit floor 68 for the purpose of cleaning the pit area or for other service reasons. To raise base 86 as shown in FIG. 8, actuator 88 first lifts deck 18 to the position of FIG. 7, and a prop 90 is installed to keep it there. Once prop 90 supports the weight of deck 18, blower 36 in conjunction with a valve system evacuates the air from within actuator 88, whereby the reduced air pressure inside actuator 88 draws base 86 up to its position of FIG. 8 because the top of actuator 88 is secured to the underside of deck 18. Once base 86 is elevated, a retainer system 92 such as a chain, hook, latch, strap, cable, or the like can hold the base 86 in its raised position even after blower 36 is de-energized.

Figure 9A:
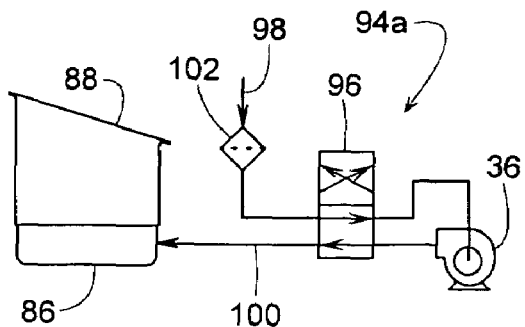
FIG. 9a is a schematic diagram showing one embodiment of an inflated actuator, a valve system in an inflate configuration, and a blower.
Figure 9B:
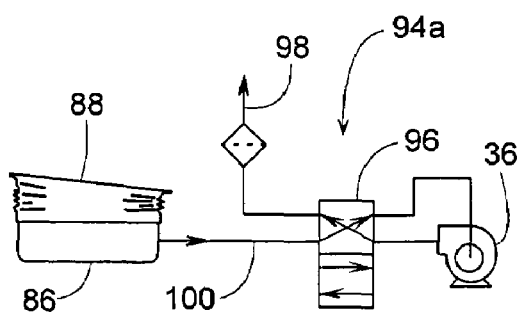
FIG. 9b is a schematic diagram similar to FIG. 9a but showing the valve system in a deflate configuration, wherein the blower forcibly deflates the actuator.

Referring further to FIGS. 9a, 9b, 10a, 10b, 11a, and 11b, to selectively pressurize actuator 88 to raise deck 18 or to depressurize actuator 88 to lift base 86 for servicing, a valve system 94a, 94b, or 94c determines whether blower 36 inflates or deflates actuator 88. Valve system 94a, for example, includes a 2-position, 4-way valve 96 that could be actuated electrically, manually, or otherwise. Valve 96 in the position shown in FIGS. 7 and 9a allows blower 36 to draw in exterior air through a first line 98 and discharge the air through a second line 100 into actuator 88, thereby pressurizing actuator 88 to raise deck 18. A filter 102 can be added to help keep the interior of actuator 88, valve 96, and blower 36 clean. To lift base 86, valve 96 can be positioned as shown in FIGS. 8 and 9b, whereby valve 96 allows blower 36 to evacuate air from within actuator 88 via line 100 and discharge the air through line 98.

It should be noted that one or more subcomponents of valve system 94a, blower 36 and filter 102 can be installed inside actuator 88 as shown in FIGS. 7 and 8, or valve system 94a can be installed outside of actuator 88 as shown in FIGS. 9a and 9b (also similar to FIGS. 1-3). The same applies to valve systems 94b and 94c, which are alternatives to valve system 94a.

Figure 10A:
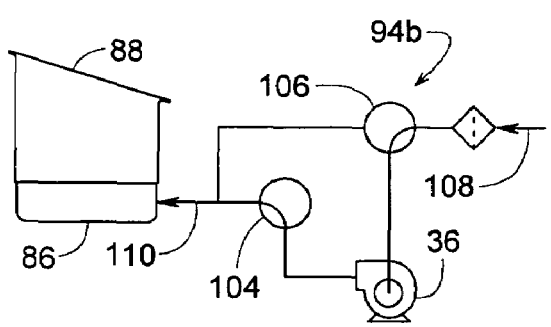
FIG. 10a is a schematic diagram showing a second embodiment of an inflated actuator, a valve system in an inflate configuration, and a blower.
Figure 10B:
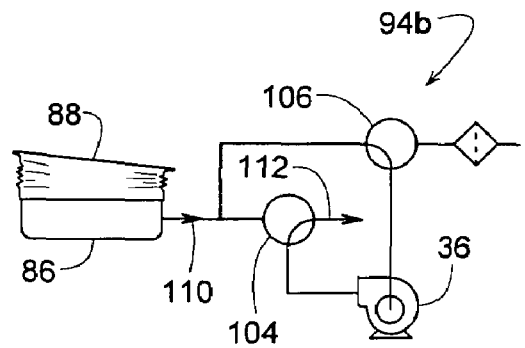
FIG. 10b is a schematic diagram similar to FIG. 10a but showing the valve system in a deflate configuration, wherein the blower forcibly deflates the actuator.

Valve system 94b of FIGS. 10a and 10b includes two 2-position, 3-way valves 104 and 106 that can be actuated electrically, manually, or otherwise. Valves 104 and 106 in their positions shown in FIG. 10a allow blower 36 to draw in exterior air through a first line 108 and discharge the air through a second line 110 into actuator 88, thereby pressurizing actuator 88 to raise deck 18. To lift base 86, valves 104 and 106 can be positioned as shown in FIG. 10b, whereby valves 104 and 106 allow blower 36 to evacuate air from within actuator 88 via line 110 and discharge the air through a discharge line 112.

Figure 11A:
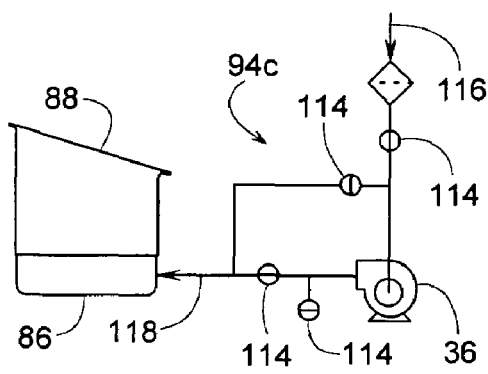
FIG. 11a is a schematic diagram showing a second embodiment of an inflated actuator, valve system in an inflate configuration, and a blower.
Figure 11B:
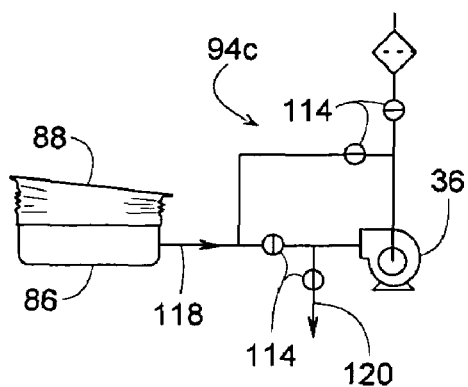
FIG. 11b is a schematic diagram similar to FIG. 11a but showing the valve system in a deflate configuration, wherein the blower forcibly deflates the actuator.

In another embodiment, a valve system 94c of FIGS. 11 and 11b includes four 2-position, 2-way valves 114 that can be actuated electrically, manually, or otherwise. Valves 114 in their positions shown in FIG. 11a allow blower 36 to draw in exterior air through a first line 116 and discharge the air through a second line 118 into actuator 88, thereby pressurizing actuator 88 to raise deck 18. To lift base 86, valves 114 can be positioned as shown in FIG. 11b, whereby the valves allow blower 36 to evacuate air from within actuator 88 via line 118 and discharge the air through a discharge line 120.

Although the invention is described with respect to a preferred embodiment, modifications thereto will be apparent to those of ordinary skill in the art.

Therefore, the scope of the invention is to be determined by reference to the following claims:

1. An air operated dock leveler for use at a loading dock, comprising:
    a deck having a rear edge and a forward edge, wherein the rear edge is adapted to be pivotally coupled to the loading dock to enable vertical movement of the forward edge relative to the loading dock;
    an inflatable actuator disposed underneath the deck, wherein the inflatable actuator comprises a pliable upper section coupled to a substantially rigid base, and the inflatable actuator contains an internal volume of air that is in contact with the pliable upper section and the base; and
    a source of pressurized air in fluid communication with the internal volume of air such that air discharged from the source of pressurized air expands the inflatable actuator to push the deck upward,
    wherein the pliable upper section is substantially cylindrical when the inflatable actuator is inflated.

2. The air operated dock leveler of claim 1, wherein the base defines an inlet that places the source of pressurized air in fluid communication with the internal volume of air.

3. The air operated dock leveler of claim 1, wherein the source of pressurized air includes a blower disposed within the inflatable actuator.

4. The air operated dock leveler of claim 3, wherein the blower is mounted to the base.

5. The air operated dock leveler of claim 3, wherein the blower is mounted to the upper section of the inflatable actuator.

6. The air operated dock leveler of claim 1, wherein at least one of the pliable upper section and the base defines an access opening for gaining access to an interior of the inflatable actuator.

7. The air operated dock leveler of claim 1, wherein the substantially rigid base is made of plastic.

8. The air operated dock leveler of claim 7, wherein the plastic is ABS.

9. An air operated dock leveler for use at a loading dock, comprising:
    a deck having a rear edge and a forward edge, wherein the rear edge is adapted to be pivotally coupled to the loading dock to enable vertical movement of the forward edge relative to the loading dock;
    an inflatable actuator disposed underneath the deck; and
    a blower disposed inside the inflatable actuator such that air discharged from the blower expands the inflatable actuator to push the deck upward.

10. The air operated dock leveler of claim 9, wherein the inflatable actuator comprises a pliable upper section joined to a more rigid base.

11. The air operated dock leveler of claim 9, wherein the inflatable actuator comprises an upper section joined to a base, and the blower is attached to the base.

12. The air operated dock leveler of claim 9, wherein the inflatable actuator comprises an upper section joined to a base, and the blower is attached to the upper section.

13. The air operated dock leveler of claim 9, wherein the inflatable actuator defines an access opening for gaining access to an interior thereof.

14. An air operated dock leveler for use at a loading dock, comprising:
    a deck having a rear edge and a forward edge, wherein the rear edge is adapted to be pivotally coupled to the loading dock to enable vertical movement of the forward edge relative to the loading dock;
    an inflatable actuator disposed underneath the deck;
    a blower; and
    a valve system that places the blower in fluid communication with the inflatable actuator, the valve system being selectively operable in an inflate configuration and a deflate configuration such that the valve system in the inflate configuration enables the blower to discharge air into the inflatable actuator to push the deck upward, and the valve system in the deflate configuration enables the blower to withdraw air from within the inflatable actuator to forcibly collapse the inflatable actuator;
    wherein the blower is disposed within the inflatable actuator.

15. The air operated dock leveler of claim 14, wherein the valve system includes a plurality of 2-way valves.

16. An air operated dock leveler for use at a loading dock, comprising:
    a deck having a rear edge and a forward edge, wherein the rear edge is adapted to be pivotally coupled to the loading dock to enable vertical movement of the forward edge relative to the loading dock;
    an inflatable actuator disposed underneath the deck;
    a blower; and
    a valve system that places the blower in fluid communication with the inflatable actuator, the valve system being selectively operable in an inflate configuration and a deflate configuration such that the valve system in the inflate configuration enables the blower to discharge air into the inflatable actuator to push the deck upward, and the valve system in the deflate configuration enables the blower to withdraw air from within the inflatable actuator to forcibly collapse the inflatable actuator;
    wherein the valve system includes a plurality of 3-way valves.

17. An air operated dock leveler for use at a loading dock, comprising:

a deck having a rear edge and a forward edge, wherein the rear edge is adapted to be pivotally coupled to the loading dock to enable vertical movement of the forward edge relative to the loading dock;

an inflatable actuator disposed underneath the deck;

a blower; and a valve system that places the blower in fluid communication with the inflatable actuator, the valve system being selectively operable in an inflate configuration and a deflate configuration such that the valve system in the inflate configuration enables the blower to discharge air into the inflatable actuator to push the deck upward, and the valve system in the deflate configuration enables the blower to withdraw air from within the inflatable actuator to forcibly collapse the inflatable actuator;

wherein the valve system includes a 4-way valve.

18. An air operated dock leveler for use at a loading dock, wherein the air operated dock leveler may be exposed to condensation, the air operated dock leveler comprising:

a deck having a rear edge and a forward edge, wherein the rear edge is adapted to be pivotally coupled to the loading dock to enable vertical movement of the forward edge relative to the loading dock;

an inflatable actuator disposed underneath the deck, wherein the inflatable actuator comprises a pliable upper section and contains an internal volume of air; a source of pressurized air in fluid communication with the internal volume of air such that air discharged from the source of pressurized air expands the inflatable actuator to push the deck upward; and a drain coupled to the inflatable actuator, wherein the drain can be periodically opened to drain the condensate that may have collected inside of the inflatable actuator.

19. The air operated dock leveler of claim 18, wherein the inflatable actuator includes a base that is more rigid than the pliable upper section and is adjacent thereto, wherein the drain is connected to the base.

20. An air operated dock leveler for use at a loading dock, comprising:

a deck having a rear edge and a forward edge, wherein the rear edge is adapted to be pivotally coupled to the loading dock to enable vertical movement of the forward edge relative to the loading dock;

an inflatable actuator disposed underneath the deck, wherein the inflatable actuator comprises a pliable upper section coupled to a substantially rigid base, and the inflatable actuator contains an internal volume of air that is in contact with the pliable upper section and the base; and a source of pressurized air in fluid communication with the internal volume of air such that air discharged from the source of pressurized air expands the inflatable actuator to push the deck upward;

wherein the base includes an upwardly extending flange joined to the pliable upper section.

21. The air operated dock leveler of claim 20, wherein the base defines an inlet that places the source of pressurized air in fluid communication with the internal volume of air.

22. The air operated dock leveler of claim 20, wherein the source of pressurized air includes a blower disposed within the inflatable actuator.

23. The air operated dock leveler of claim 21, wherein the blower is mounted to the base.

24. The air operated dock leveler of claim 21, wherein the blower is mounted to the upper section of the inflatable actuator.

25. The air operated dock leveler of claim 20, wherein at least one of the pliable upper section and the base defines an access opening for gaining access to an interior of the inflatable actuator.

26. The air operated dock leveler of claim 20, wherein the substantially rigid base is made of plastic.

* * * * *